United States Patent [19]

Arakawa et al.

[11] Patent Number: 4,711,732
[45] Date of Patent: Dec. 8, 1987

[54] RADIATION-RESISTANT GREASE

[75] Inventors: Kazuo Arakawa; Naohiro Hayakawa; Kenzo Yoshida, all of Gunma; Tetsuya Yagi, Osaka; Hiroshi Nakanishi, Hyogo, all of Japan

[73] Assignees: Japan Atomic Energy Research Institute, Tokyo; Matsumura Oil Research Corporation, Hyogo, both of Japan

[21] Appl. No.: 843,644

[22] Filed: Mar. 25, 1986

[30] Foreign Application Priority Data

May 28, 1985 [JP] Japan ................................ 60-114657

[51] Int. Cl.$^4$ ................ C10M 113/08; C10M 113/12
[52] U.S. Cl. ...................................... 252/28; 252/18; 252/25
[58] Field of Search ............................. 252/18, 25, 28

[56] References Cited

U.S. PATENT DOCUMENTS 3,785,974  1/1974  Scott ................................... 252/28

FOREIGN PATENT DOCUMENTS

| 630666 | 11/1961 | Canada | 252/28 |
| 649973 | 10/1962 | Canada | 252/28 |
| 659407 | 3/1963 | Canada | 252/28 |
| 659408 | 3/1963 | Canada | 252/28 |
| 659410 | 3/1963 | Canada | 252/28 |
| 659412 | 3/1963 | Canada | 252/28 |

OTHER PUBLICATIONS

Crawford, W. and Cox, D. B., Radiation Resistant Greases, The Institute of Petroleum, Aug. 1961.

*Primary Examiner*—William R. Dixon, Jr.
*Assistant Examiner*—Ellen M. McAvoy

[57] ABSTRACT

A radiation-resistant grease employed in various machines at nuclear facilities, based on (A) an oil principally composed of a phenoxyphenoxydiphenyl and a mono- and/or dialkyldiphenyl ether and (B) a bentonite based thickening agent, if necessary, together with (C) a gelling aid of alcohol, ketone, or carbonate ester.

2 Claims, No Drawings

RADIATION-RESISTANT GREASE

BACKGROUND OF THE INVENTION

The present invention relates to a grease having improved radiation resistance. More particularly, the present invention relates to a radiation-resistant grease which has bentonite (thickening agent) and an alcohol, ketone or ester (gelling aid) incorporated in a base oil which is made of a mixture of a phenoxyphenoxydiphenyl and a mono- and/or dialkyldiphenyl ether.

Grease is employed in various machines at nuclear facilities such as power plants and fuel reprocessing plants, or at irradiation facilities such as cobalt-irradiating equipment and nuclear accelerators, and is subjected to two types of deterioration, one resulting from aging and the other caused by radiation exposure. The deteriorated grease is replaced at the time of periodic inspections and at other suitable occasions but the frequency of grease replacement is desirably held to a minimum in order to improve the degree of capacity utilization of the facilities and to reduce the frequency of exposure to radiation on the part of personnel. A situation therefore exists to require the development of a grease having superior resistance to radiation.

The greases currently employed in machines at nuclear facilities are roughly divided into two types: the silica gel grease that uses a petroleum based lubricant as a base oil, and the soap base grease that incorporates a petroleum based lubricant or a synthetic oil as a base oil. However, these conventional greases are not possessed of adequate resistance to radiation. If the silica gel grease using a petroleum based lubricant as a base oil is employed in machines at a high dose rate irradiation site, the base oil solidifies as a result of radiation-induced polymerization and its lubricating property is lost within a short time to cause premature wear of the machine. On the other hand, the soap base grease which uses a petroleum based lubricant or a synthetic oil as a base oil will soft as a result of exposure to an increased dose of radiation, and the fluidized grease will leak out of the machine. A possible cause of these phenomena is the loss of radiation resistance not only of the base oil and the thickening agent present in the grease but also of the gel structure which is formed as a result of interaction between the base oil and the thickening agent. It would therefore be clear that in order to provide a grease with enhanced radiation resistance, it is important that not only a base oil and a thickening agent having improved radiation resistance shoul be used but also the characteristic gel structure formed as a result of interaction between the base oil and the thickening agent should be stable to radiation.

The present invention has been accomplished in order to develop a highly radiation-resistant grease which is free from the defects of the conventional products.

In Unexamined Published Japanese Patent Application No. 100197/1984, the present inventors disclosed that an oil based on a mixture of a phenoxyphenoxydiphenyl and a mono-or dialkyldiphenyl ether exhibited superior resistance to radiation. The present inventors later found that a base oil which was composed of such oil, a bentonite-based thickening agent and a gelling aid which was chosen from an alcohol, ketone or carbonate ester would provide a grease having sufficiently improved radiation resistance to ensure reliable performance when used as a grease in machines at irradiation sites.

SUMMARY OF THE INVENTION

The general object, therefore, of the present invention is to provide a radiation-resistant grease that is based on an oil principally composed of a phenoxyphenoxydiphenyl and a mono- and/or dialkyldiphenyl ether and which contains a bentonite based thickening agent and an alcohol, ketone or carbonate ester as a gelling aid.

In accordance with one aspect, the present invention provides a radiation-resistant grease which consists essentially of:

(A) 70 to 97 wt % of a base oil composed of the following components:

a. 25 to 75 wt % of a phenyl ether based synthetic oil comprised of 0 to 70 wt % of o- (m-phenoxyphenoxy)diphenyl and 100 to 30 wt % of m-(m-phenoxyphenoxy)diphenyl; and b. 75 to 25 wt % of a mono- and/or dialkyldiphenyl ether having 6 to 20 carbon atoms in the alkyl group; and (B) 3 to 30 wt % of a bentonite based thickening agent. In accordance with another aspect, the present invention provides a radiation-resistant grease which consists essentially of:

(A) 60 to 96.5 wt % of a base oil composed of the following components:

a. 25 to 75 wt % of a phenyl ether synthetic oil comprised of 0 to 70 wt % of o-(m-phenoxyphenoxy)diphenyl and 100 to 30 wt % of m-(m-phenoxyphenoxy)diphenyl; and b. 75 to 25 wt % of a mono- and/or dialkyldiphenyl ether having 6–20 carbon atoms in the alkyl group;

(B) 3 to 30 wt % of a bentonite based thickening agent; and (C) 0.5 to 10 wt % of at least one gelling aid selected from the group consisting of an aliphatic alcohol having 1–5 carbon atoms, an aliphatic ketone having 3–8 carbon atoms and an aliphatic carbonate ester having 2–5 carbon atoms in the aliphatic group.

The radiation-resistant grease in accordance with the first aspect of the present invention contains, when it is being prepared, 0.5–10 wt % of a gellin aid selected from the group consisting of an aliphatic alcohol having 1–5 carbon atoms and an aliphatic ketone having 3–8 carbon atoms, together with the other necessary components (1) and (2), and at the last stage of preparation, the alcohol amd/or ketone are removed by, for example, evaporation under vacuum, to thereby produce a grease which is substantially composed of the base oil (A) and the thickening agent (B).

DETAILED DESCRIPTION OF THE PREFERRED EMBODIMENT

In both types of grease prepared in accordance with the present invention, the phenoxyphenoxydiphenyl (a) which is one of the two components of the base oil should be composed of 0 to 70 wt % of o-(m-phenoxyphenoxy)diphenyl and 100 to 30 wt % of m-(m-phenoxyphenoxy)diphenyl. If the proportions of the two diphenyls are outside the ranges specified above, the miscibility of the two diphenyls with each other, and with the mono- and/or dialkyldiphenyl ether which is the other component of the base oil is decreased to such an extent that either phase separation or the crystallization of o-(m-phenoxyphenoxy)diphenyl occurs. A preferable range of the proportions of the two diphenyls is such that 0 to 30 wt % of o-(m-phenoxyphenoxy)diphenyl is combined with 100 to 70 wt % of m-(m-phenoxyphenoxy)diphenyl. In the most preferable case, component (a) is solely composed of m-(m-phenoxyphenoxy) diphenyl.

The monoalkyldiphenyl ether or dialkyldiphenyl ether (b) which is the other component of the base oil may be such that the alkyl group contains 6-20 carbons atoms. The alkyl group preferably contains 10-18, more preferably 14-16, carbon atoms. These mono- and dialkyldiphenyl ethers may be mixed with the component (a) either independently or in combination with each other. The alkyl group in each of these alkyldephenyl ethers having 6-20 carbon atoms may be straight- or branched-chained, and illustrative examples of such alkyl group include n-hexyl, 2-methylpentyl, n-heptyl, 2,methylhexyl, n-octyl, 2-methylheptyl, n-nonyl, 3-methyloctyl, n-decyl, 2-methylnonyl, n-undecyl, 2-methyldecyl, n-dodecyl, 2-methylundecyl, n-tridecyl, cetyl, stearyl and eicosyl.

The base oil is composed of 25 to 75 wt %, preferably 40 to 60 wt %, of the phenoxyphenoxydiphenyl (a) having the composition described above, and 75 to 25 wt %, preferably 60 to 40 wt %, of the mono- and/or dialkyldiphenyl ether (b). In accordance with the first aspect; of the present invention, the base oil is used in an amount of 70 to 98 wt %, preferably 80 to 90 wt %, of the final grease, while in accordance with the second aspect of the invention, the base oil is employed in an amount of 60 to 96.5 wt %, preferably 80 to 90 wt %, of the final grease.

The present inventors have found that if the base oil specified above is mixed with a bentonite thickening agent in the presence of an appropriate gelling aid, it forms a gel structure which is stable to radiation exposures, thus providing a grease that has and maintains an appropriate degree of consistency while exhibiting a high dripping point and enhanced resistance to oxidation. In order to attain these effects, the bentonite thickening agent should be incorporated in an amount of 3 to 30 wt % of the grease, with the range of 10 to 18 wt % being preferable. Most preferably, the bentonite thickening agent is used in an amount of about 14 to 16 wt %. Examples of the bentonite thickening agent that may be used in the present invention include Bentone 27, Bentone 33, Bentone 34, Bentone 38, Bentone SD-1 and Bentone SD-2 (Bentone is the trademark of N.L. Industries), and New D Orbene (Orbene is the trademark of Shiraishi Kogyo K.K.)

The gelling aid used in the present invention assists the base oil [i.e., composed of the phenoxyphenoxydiphenyl (a) and the mono- and/or dialkyldiphenyl ether (b) and the bentonite thickening agent in forming a gel structure which is stable to radiation exposures, and this gelling aid is at least one compound selected from the group consisting of an aliphatic alcohol having 1-5 carbon atoms, an aliphatic ketone having 3-8 carbon atoms, and an aliphatic carbonate ester having 2-5 carbon atoms in the aliphatic group.

Usable sliphatic alcohols are methyl alcohol, ether alcohol, propyl alcohol, isopropyl alcohol, butyl alcohol, sec-butyl alcohol, t-butyl alcohol and amyl alcohol. Usable aliphatic ketones are acetone, diethyl ketone, di-n-propyl ketone, diisopropyl ketone, methyl ethyl ketone, methyl propyl ketone, methyl butyl ketone, methyl-sec-butyl ketone, methyl amyl ketone and ethyl amyl ketone. Usable aliphatic carbonate esters are those esters which derive from alkenes and carbonic acid, such as ethylene carbonate, propylene carbonate, butene carbonate, pentence carbonate, and 3-methylbutene carbonate.

The above-listed alcohols, ketones and esters may be used either independently or in combination. They are added in amounts ranging from 0.5 to 10 wt %, preferably 0.5 to 5 wt %, more preferably 1 to 3 wt %, of the grease.

Although it is essential that the grease of the present invention satisfies the aforementioned requirements for the components and their proportions, the compounds used as the gelling aid are more or less volatile and may evaporate during storage or service. However, once the stable gel structure has formed, subsequent evaporation of the gelling aid is by no means deterimental to the performance of the grease. Therefore, it should be understood that the grease of the present invention allows for a change in its composition resulting from the evaporation of the gelling aid during storage or use.

Alcohols and/or ketones used as a gelling aid in the present invention may catch fire and they additionally have characteristic odors. Therefore, such alcohols and/or ketones are preferably removed at the final stage of grease preparation by evaporation under vacuum and/or heating. In this case, the grease of the present invention in its final product form is substantially free of the gelling aid and composed solely of the base oil and the bentonite thickening agent. If an ester is used as the gelling aid, it does not need to be removed.

The grease of the present invention may be readily produced by a standard method which proceeds as follows: a predetermined amount of the base oil composed of predetermined proportions of the phenoxyphenoxydiphenyl (a) and the mono- and/or dialkyldiphenyl ether (b) is mixed with a predetermined amount of the bentonite thickening agent; alternatively, predetermined amounts of the base oil components (a) and (b), as well as a predetermined amount of the bentonite thickening agent, are mixed together. Mixing may be effected with a conventional mixer, say, a double planetary mixer. Ambient temperature is typically used, but mixing under elevated temperatures up to about 100° C. is acceptable. A period of about 1 to 3 hours is generally sufficient to achieve uniform mixing.

Subsequently, a predetermined amount of the gelling aid is added to the mixture and the respective components are then well mixed under agitation at a temperature ranging from ambient temperature up to the boiling point of the gelling aid (e.g. ca. 60°-90° C. if the gelling aid is propylene carbonate).

The resulting mixture is then homogenized by a standard method using speedline mill, homogenizer or rolling. The homogenizing temperature and period generally range from 50°to 120° C. from 10 to 60 minutes, respectively. By this homogenizing treatment, the base oil intracts with the thickening agent to form the desired gel structure and yield a grease having the desired degree of radiation resistance.

If an alcohol and/or ketone is used as the gelling aid, the resulting grease may optionally be treated under vacuum so as to remove the alcohol and/or ketone by evaporation. Satisfactory results are obtained by reducing the pressure to about 1-2 Torr and maintaining this level of pressure for a period no longer than about 1 hour, typically within the limits of about 10 and 20 minutes. Evaporation of the gelling aid may be performed by heating the grease to an elevated temperature not exceeding 150° C., at atmospheric or subatmospheric pressure.

If the components specified above are used in the amounts also specified above and the blend is treated by the procedures shown above, a high dropping point radiation-resistant grease is obtained and, as will be demonstrated by the Examples given below, this grease maintains an appropriate degree of consistancy and will not experience destruction of the gel structure to any significant extent even if it is exposed to radiation, and additionally, this grease undergose an extremely low level of oxidative degradation.

The following working examples and comparative examples are provided for the purpose of further illustrating the construction and advantages of the present invention and are by no means to be taken as limiting.

EXAMPLE 1

To an intimate mixture of m-(m-phenoxyphenoxy)-diphenyl (1,380 g), a monalkyldiphenyl ether (460 g; 16 carbon atoms in the alkyl group) and Bentone (420 g), 70 g of propylene carbonate was added, and the resulting mixture was agitated for 3 hours at 70° C. The mixture then was treated in speedline mill to prepare 2,200 g of a grease.

The grease was spread onto a glass plate (20 cm×20 cm×1.5 mm) to form a coat in a thickness of 1 mm. The grease coat was irradiated with gamma-rays from $^{60}Co$ at a dose rate of 1 MR/hr to give a total dose of 1,000 MR or 3,000 MR. The properties of the grease being measured before and after the irradiation are shown in Table 2. The values of mixed consistency, oil release (100° C.×24 hours), dropping point and percentage of free acid given in Table 2 were obtained by measurement in accordance with JIS K2220.

EXAMPLES 2 to 9

Greases having the composition indicated in Table 2 were prepared by repeating the procedures of Example 1. The mixed consistency, oil release, dropping point and percentage of free acid of each grease being measured before and after irradiation are summarized in Table 2.

TABLE 1

| | Base oil | | | | Bentonite | Gelling aid | | |
|---|---|---|---|---|---|---|---|---|
| Ex. No. | m-4P2E*[1] (g) | o-4P2E*[2] (g) | MADE*[3] No. of C atoms*[5] (g) | DADE*[4] No. of C atoms*[5] (g) | (Bentone 34) (g) | $PrCO_3$*[6] (g) | $CH_3OH$ (g) | $(CH_3)_2CO$ (g) |
| 2 | 570 | 850 | — | C - 16 470 | 370 | 70*[7] | — | — |
| 3 | 470 | 470 | C - 18 940 | — | 370 | 70 | — | — |
| 4 | 470 | — | — | C - 18 1420 | 370 | — | — | 70*[8] |
| 5 | 570 | 850 | C - 6 470 | — | 370 | 70*[7] | — | — |
| 6 | 570 | 850 | C - 10 470 | — | 364 | 23*[7] | — | — |
| 7 | 570 | 850 | C - 20 470 | — | 383 | — | 120*[8] | — |
| 8 | 570 | 850 | — | C - 10 470 | 370 | 70*[7] | — | — |
| 9 | 570 | 850 | C - 10 282 | C - 10 188 | 370 | 70*[7] | — | — |

*[1]m-(m-phenoxyphenoxy)diphenyl;
*[2]o-(m-phenoxyphenoxy)diphenyl;
*[3]monoalkyldiphenyl ether;
*[4]dialkyldiphenyl ether;
*[5]the number of carbon atoms in the alkyl group in mono- or dialkyldiphenyl ether;
*[6]propylene carbonate;
*[7]stirred at 80° C. after addition of gelling aid;
*[8]stirred at 60° C. after addition of gelling aid:

TABLE 2

| | Before irradiation | | | | After irradiation to 1000 MR | | | | After irradiation to 3000 MR | | | |
|---|---|---|---|---|---|---|---|---|---|---|---|---|
| Run No. | worked pene-tration | oil sep-aration (%) | free acid (%) | dropping point | worked pene-tration | oil sep-aration (%) | free acid (%) | dropping point | worked pene-tration | oil sep-aration (%) | free acid (%) | dropping point |
| Ex. 1 | 256 | 0.0 | 0.0 | | 273 | 0.0 | 2.0 | | 280 | 0.0 | 3.0 | |
| Ex. 2 | 269 | 0.0 | 0.0 | | 270 | 0.2 | 2.1 | | 283 | 0.0 | 2.8 | |
| Ex. 3 | 289 | 0.0 | 0.0 | | 253 | 0.0 | 3.5 | | 220 | 0.0 | 10.4 | |
| Ex. 4 | 284 | 0.0 | 0.0 | | 240 | 0.0 | 4.0 | | 170 | 0.0 | 12.0 | |
| Ex. 5 | 270 | 0.0 | 0.0 | >300° C. | 272 | 0.1 | 1.8 | >300° C. | 280 | 0.1 | 2.7 | >300° C. |
| Ex. 6 | 272 | 0.1 | 0.1 | | 274 | 0.2 | 2.0 | | 285 | 0.2 | 2.7 | |
| Ex. 7 | 268 | 0.1 | 0.1 | | 285 | 0.3 | 2.4 | | 293 | 0.3 | 3.2 | |
| Ex. 8 | 270 | 0.1 | 0.1 | | 288 | 0.3 | 2.4 | | 295 | 0.3 | 3.3 | |
| Ex. 9 | 265 | 0.1 | 0.1 | | 267 | 0.2 | 2.0 | | 278 | 0.2 | 2.8 | |
| Comp. Ex. 1*[9] | 269 | 0.6 | 0.1 | 175° C. | | | | liquified at 620 MR | | | | |
| Comp. Ex. 2*[10] | 306 | 0.5 | 0.3 | >300° C. | 406 | 1.1 | 17.8 | >300° C. | solidified at 2,000 MR | | | |
| Comp. | 306 | 0.6 | 0.4 | 260° C. | 411 | 8.6 | 6.4 | 168° C. | 418 | 44.5 | 14.9 | 140° C. |

TABLE 2-continued

| | Before irradiation | | | | After irradiation to 1000 MR | | | | After irradiation to 3000 MR | | | |
|---|---|---|---|---|---|---|---|---|---|---|---|---|
| Run No. | worked pene- tration | oil sep- aration (%) | free acid (%) | dropping point | worked pene- tration | oil sep- aration (%) | free acid (%) | dropping point | worked pene- tration | oil sep- aration (%) | free acid (%) | dropping point |
| Ex. 3*[11] | | | | | | | | | | | | |

*[9] commercial grease made of a petroleum based lubricant and lithium soap
*[10] commercial radiation-resistant grease made of a petroleum based lubricant and silica gel
*[11] commercial radiation-resistant grease made of a synthetic lubricant and sodium n-octadecyl terephthalamate The data in Table 2 show the superiority of the grease of the present invention relative to commercial products of radiation-resistant grease: it experienced a smaller change in consistency as a result of radiation exposure; the degree of oil release and the melting point which are a measure for the destruction of gel structure remained substantially constant; and the formation of a free acid which is indicative of the oxidative degradation of an oil only occurred at a low level.

What is claimed is:
1. Radiation-resistant grease composed of:
(A) 70-97 wt % of a base oil composed of the following components:
  a. 25-75 wt % of a phenyl ether based synthetic oil comprised of 0-70 wt % of o-(m-phenoxyphenoxy)diphenyl and 100-30 wt % of m-(m-phenoxyphenoxy)diphenyl; and
  b. 75-25 wt % of a mono- and/or dialkyldiphenyl ether having 6-20 carbon atoms in a alkyl group; and
(B) 3-30 wt % of a bentonite based thickening agent.
2. Radiation-resistant grease composed of:
(A) 60-96.5 wt % of a base oil composed of the following components:
  a. 25-75 wt % of a phenyl ether based synthetic oil comprised of 0-70 wt % of o(m-phenoxyphenoxy)diphenyl and 100-30 wt % of m-(m-phenoxyphenoxy)diphenyl; and
  b. 75-25 wt % of a mono- and/or dialkyldiphenyl ether having 6-20 carbon atoms in the alkyl group;
(B) 3-30 wt % of a bentonite based thickening agent; and
(C) 0.5-10 wt % of at least one gelling aid selected from the group consisting of an aliphatic alcohol having 1-5 carbon atoms, an aliphatic ketone having 3-8 carbon atoms and an aliphatic carbonate ester having 2-5 carbon atoms in the aliphatic group.

* * * * *